(12) United States Patent
Moghal et al.

(10) Patent No.: US 10,670,235 B1
(45) Date of Patent: Jun. 2, 2020

(54) SYSTEMS AND METHODS FOR OBSTRUCTION DETECTION ON A LUMINAIRE OPTICS

(71) Applicant: Eaton Intelligent Power Limited, Dublin (IE)

(72) Inventors: Khurram Moghal, Senoia, GA (US); Walten Peter Owens, Chittenango, NY (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/525,910

(22) Filed: Jul. 30, 2019

(51) Int. Cl.
| H05B 33/00 | (2006.01) |
| F21V 15/00 | (2015.01) |
| F21V 23/04 | (2006.01) |
| G01J 1/44 | (2006.01) |
| G01J 1/42 | (2006.01) |

(52) U.S. Cl.
CPC .......... *F21V 15/00* (2013.01); *F21V 23/0442* (2013.01); *G01J 1/44* (2013.01); *G01J 2001/4252* (2013.01)

(58) Field of Classification Search
CPC ............ H05B 33/0842; H05B 33/0863; H05B 37/0227; H05B 33/0815; H05B 33/0827; H05B 33/0845; H05B 33/086; H05B 33/0866; H05B 33/0869; H05B 33/089; H05B 37/0272; H05B 37/0281; B60Q 1/08; B60Q 1/115; B60Q 1/18
See application file for complete search history.

(56) References Cited

U.S. PATENT DOCUMENTS

| 2017/0156189 A1 | 6/2017 | Jayawardena et al. |
| 2018/0288848 A1 | 10/2018 | Gao et al. |

*Primary Examiner* — Monica C King
(74) *Attorney, Agent, or Firm* — Fox Rothschild LLP

(57) ABSTRACT

A lighting module includes a substrate, an obstruction sensor and a light source mounted on the substrate, and an optical assembly located over the light source. The obstruction sensor includes a transceiver to transmit radiation towards the optical assembly and receive radiation reflected by the optical assembly. The reflected radiation is indicative of one or more conditions of the optical assembly. The obstruction sensor may be an infrared (IR) sensor. The lighting module may also include a processor having programming instructions to receive information corresponding to the radiation reflected by the optical assembly from the obstruction detection sensor, analyze the received information to determine the presence of at least a threshold level of an obstruction or a deformity on the optical assembly, and in response to determining the presence of at least the threshold level of the obstruction or the deformity on the optical assembly, perform a restorative action.

20 Claims, 5 Drawing Sheets

SYSTEMS AND METHODS FOR OBSTRUCTION DETECTION ON A LUMINAIRE OPTICS

BACKGROUND

The advent of light emitting diode (LED) based luminaires has provided sports arenas, stadiums, other entertainment facilities, and other commercial and industrial facilities the ability to achieve instant on-off capabilities, intelligent controls and adjustability while delivering excellent light quality, consistent light output, and improved energy efficiency. Because of this, users continue to seek improvements in LED lighting devices. The condition or optical quality of an optics (e.g., lens, optical cover, reflector, etc.) of a luminaire may impede the light output and the operation of the luminaire.

For example, accumulation of dirt and debris, water, frost, or other elements on the optics of the luminaire may lead to undesirable changes in the light output of the luminaire and/or may cause damage to the luminaire itself. For example, accumulation of dirt and debris on a luminaire optics may lead to an increase in the inside temperature of the luminaire which cannot be removed by a heat sink effectively, and damage may occur if the inside temperature of the luminaire increases over a temperature threshold. Examples of such damage may include yellowing of the optics, cracking, deformation, or the like.

Maintenance operations on luminaire equipment may occur before damage occurs (i.e., preventive maintenance) or after damage occurs (i.e., repair and/or replacement maintenance). It is more costly to repair a damaged luminaire than to perform preventive maintenance, whereas replacement of the whole unit comes at an even greater cost to include loss of use of the luminaire equipment while replacement parts are delivered. It is, therefore, desirable to discover problems (e.g., detection of obstruction of the luminaire optics) before they can cause damage.

This document describes a lighting fixture and methods of manufacturing thereof that are directed to solving the issues described above, and/or other problems.

SUMMARY

In one or more scenarios, a lighting module for a lighting device may include a light source mounted on a substrate, an optical assembly positioned over the light source, and an obstruction sensor having a transceiver configured to transmit radiation towards the optical assembly and receive radiation reflected by the optical assembly. The reflected radiation may be indicative of one or more conditions of the optical assembly. The light source may be a light emitting diode (LED). The obstruction sensor may also be mounted on the substrate. Optionally, and/or additionally, the obstruction sensor may be an infrared (IR) sensor and the transmitted radiation may be IR radiation.

In some embodiments, the lighting module may also include a processor and a non-transitory computer-readable medium having programming instructions that when executed by the processor, cause the processor to receive information corresponding to the radiation reflected by the optical assembly from the obstruction detection sensor, analyze the received information to determine the presence of at least a threshold level of an obstruction or a deformity on the optical assembly, and in response to determining the presence of at least the threshold level of the obstruction or the deformity on the optical assembly, perform a restorative action. The restorative action may provide an alert to a user. The alert may be instructions to repair the obstruction or the deformity, instructions to control power delivered to the at least one light source, or information relating to the obstruction or the deformity. The programming instructions to control the power delivered to the light source may include instructions to reduce power delivered to the light source while maintaining a constant illumination output by the lighting device. Optionally, the restorative action may control power delivered to the light source. The programming instructions may also be designed to cause the processor to analyze the received information to determine a rate of conditions of the optical assembly, to analyze the rate of change of conditions to determine whether the lighting module includes a problem, and to provide an alert to a user, wherein the alert includes information about the problem. Accumulation of debris, dirt, liquid, moisture, or foreign materials on an inside or an outside of the optical assembly are types of obstructions or deformities. Likewise, changes in color, change in shape, breakage, or formation of pits are also types of obstructions or deformities. The threshold level may be determined based on the type of light source, the optical assembly material, a material of other components of the lighting module, one or more ambient conditions, a type of use of the lighting module, or efficiency of a heat sink associated with the lighting module. The programming instructions may further be designed to cause the processor to analyze the received information to determine a type of obstruction or deformity, a level of obstruction or deformity, or a location of obstruction or deformity on the optical assembly.

Alternatively, in another embodiment, an obstruction sensor may sense real-time conditions of an optical assembly of a lighting device. The obstruction sensor may include a transceiver configured to transmit radiation towards the optical assembly and receive radiation reflected by the optical assembly. The reflected radiation may be indicative of one or more conditions of the optical assembly.

In an embodiment, the obstruction sensor may also include a processor and a non-transitory computer-readable medium having programming instructions that when executed by the processor, cause the processor to receive information corresponding to the radiation reflected by the optical assembly from the obstruction detection sensor, analyze the received information to determine the presence of at least a threshold level of an obstruction or a deformity on the optical assembly, and in response to determining the presence of at least the threshold level of the obstruction or the deformity on the optical assembly, perform a restorative action. The restorative action may provide an alert to a user. The alert may be instructions to repair the obstruction or the deformity, instructions to control power delivered to the lighting device, or information relating to the obstruction or the deformity. The programming instructions to control the power delivered to the lighting device may include instructions to reduce power delivered to the lighting device while maintaining a constant illumination output by the lighting device. Optionally, the restorative action may control power delivered to the lighting device. The programming instructions may also be designed to cause the processor to analyze the received information to determine a rate of conditions of the optical assembly, to analyze the rate of change of conditions to determine whether the lighting device includes a problem, and to provide an alert to a user, wherein the alert includes information about the problem. Accumulation of debris, dirt, liquid, moisture, or foreign materials on an inside or an outside of the optical assembly are types of obstructions or deformities. Likewise, changes in color, change in shape, breakage, or formation of pits are also types of obstructions or deformities. The threshold level may be determined based on the type of lighting device, the use of the lighting device, the optical assembly material, the material of other components of the lighting device, one or more ambient conditions, or efficiency of a heat sink associated with the lighting device. The programming instructions may further be designed to cause the processor to analyze the received information to determine a type of obstruction or deformity, a level of obstruction or deformity, or a location of obstruction or deformity on the optical assembly.

BRIEF DESCRIPTION OF THE DRAWINGS

FIG. 3 is a cross-sectional view along cutline 3-3 of the lighting module seen in

FIG. 2.

DETAILED DESCRIPTION

Figure 1:
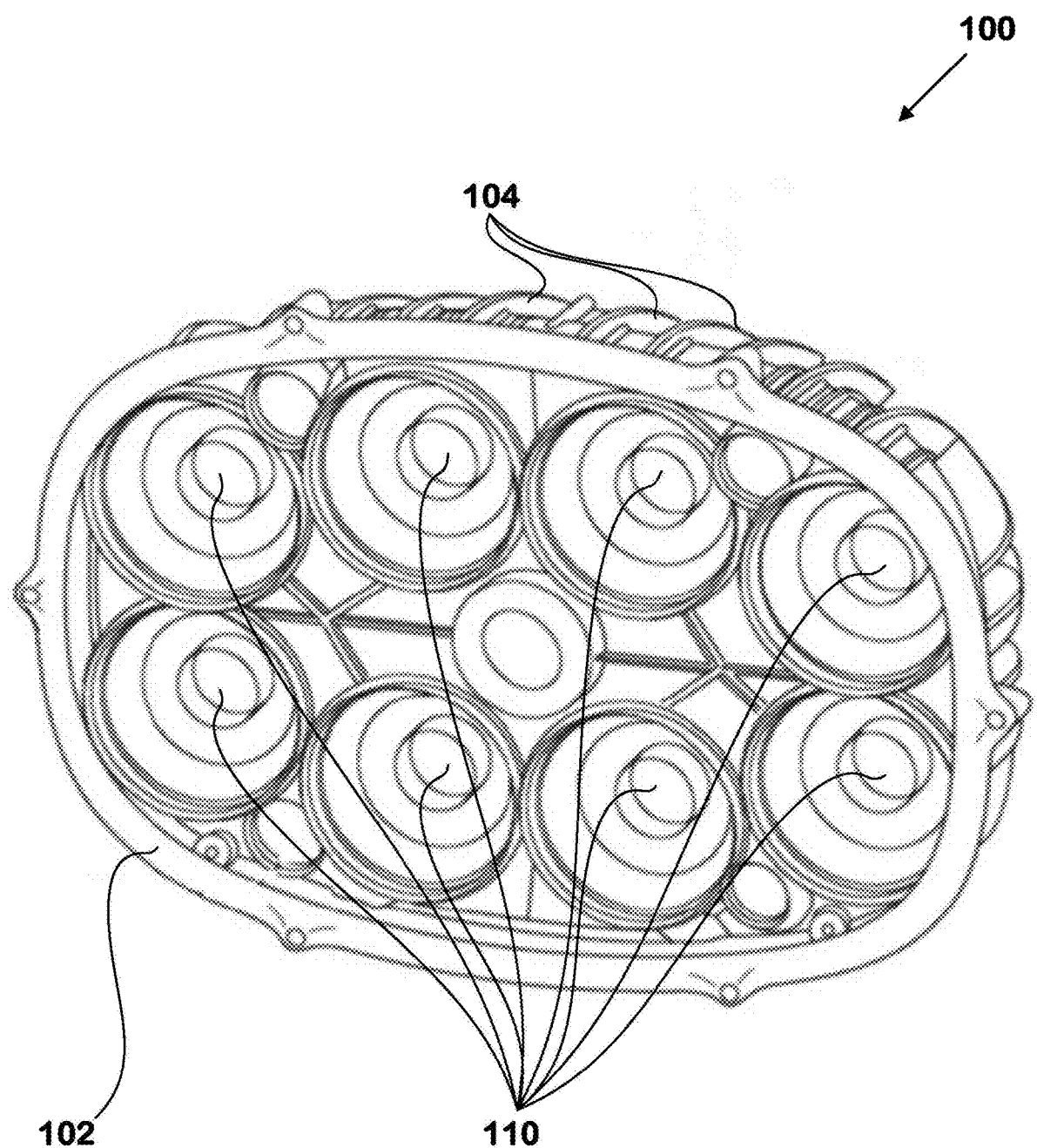
FIG. 1 illustrates a perspective view of an example lighting device, according to an embodiment.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

When used in this document, terms such as "top" and "bottom," "upper" and "lower", or "front" and "rear," are not intended to have absolute orientations but are instead intended to describe relative positions of various components with respect to each other. For example, a first component may be an "upper" component and a second component may be a "lower" component when a light fixture is oriented in a first direction. The relative orientations of the components may be reversed, or the components may be on the same plane, if the orientation of a light fixture that contains the components is changed. The claims are intended to include all orientations of a device containing such components.

In this document, the terms "lighting device," "light fixture," "luminaire" and "illumination device" are used interchangeably to refer to a device that includes a source of optical radiation. Sources of optical radiation may include, for example, light emitting diodes (LEDs), light bulbs, ultraviolet light or infrared sources, or other sources of optical radiation. In the embodiments disclosed in this document, the optical radiation emitted by the lighting devices includes visible light. A lighting device will also include a housing, one or more electrical components for conveying power from a power supply to the device's optical radiation source, and optionally control circuitry.

In this document, the terms "controller" and "controller device" mean an electronic device or system of devices containing a processor and configured to command or otherwise manage the operation of one or more other devices.

A controller will typically include a processing device, and it will also include or have access to a memory device that contains programming instructions configured to cause the controller's processor to manage operation of the connected device or devices.

In this document, the terms "memory" and "memory device" each refer to a non-transitory device on which computer-readable data, programming instructions or both are stored. Except where specifically stated otherwise, the terms "memory" and "memory device" are intended to include single-device embodiments, embodiments in which multiple memory devices together or collectively store a set of data or instructions, as well as one or more individual sectors within such devices.

In this document, the terms "processor", "processing device", "processing circuit" refer to a hardware component of an electronic device (such as a controller) that is configured to execute programming instructions. Except where specifically stated otherwise, the singular term "processor" or "processing device" is intended to include both single processing device embodiments and embodiments in which multiple processing devices together or collectively perform a process.

An "electronic device" refers to an electronic device having a processor, a memory device, and a communication interface for communicating with proximate and/or local devices. The memory will contain or receive programming instructions that, when executed by the processor, will cause the electronic device to perform one or more operations according to the programming instructions. Examples of electronic devices include personal computers, servers, mainframes, virtual machines, containers, gaming systems, televisions, and portable electronic devices such as smartphones, wearable virtual reality devices, Internet-connected wearables such as smart watches and smart eyewear, personal digital assistants, tablet computers, laptop computers, media players and the like. Electronic devices also may include appliances and other devices that can communicate in an Internet-of-things arrangement, such as smart thermostats, home controller devices, voice-activated digital home assistants, connected light bulbs and other devices. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container may also be considered to be an electronic device. In the discussion below, a client device, server device, virtual machine or container may be referred to simply as a "device" for brevity. Additional elements that may be included in electronic devices will be discussed below in the context of FIG. 5.

FIG. 1 illustrates one embodiment of an example lighting device 100 that is configured to detect an obstruction on one or more of its components. As shown in FIG. 1, the lighting device 100 includes a housing 102 that encases various components of a light fixture. The housing 102 includes an opening in which an optical radiation source such as any number of lighting modules 110 that include LEDs are included. Any number of lighting modules 110, such as one, two, three, four, five or more, sufficient to provide a high intensity LED device, may be positioned within the opening in any configuration. In various embodiments, a lighting device may include multiple types of lighting modules. For example, a lighting device may include a first type of lighting module having LEDs that are configured to selectably emit white light of various color temperatures, along with a second type of lighting module having LEDs that are configured to selectably emit light of various colors. The lighting modules 110 may include an optional optical arrangement (interchangeably, "optics" or "optical assembly") comprising one or more optical elements, as will be described in more detail below.

The device's housing 102 may also include an optional heat sink 104 for dissipating heat that is generated by the LEDs of the lighting modules 110. The heat sink 104 may be formed of aluminum and/or other metal, plastic or other material, and it may include any number of fins on the exterior to increase its surface area that will contact a surrounding cooling medium (typically air). Thus, heat from the LEDs may be drawn away from the lighting modules 110 and dissipated via the fins of the heat sink 104.

While the lighting modules 110 are positioned at one side of the housing 102, the opposing side of the housing may include or be connected to a power supply (not showy here). The power supply may include a battery, solar panel, or circuitry to receive power from an external and/or other internal source. The external housing of the power supply also may include fins to help dissipate heat from the power supply. Power wiring may be positioned within the housing 102 to direct power from the power supply to the LEDs.

The housing 102 also may hold electrical components such as a fixture controller and wiring and circuitry to supply power and/or control signals to the lighting modules 110. A fixture controller may be an external device or an integral device that includes various components of a lighting device's control circuitry (such as a processor and memory with programming instructions, an application-specific integrated circuit or a system-on-a-chip, a communications interface, etc.) configured to selectively control which LEDs in the lighting modules 110 are to receive power, and to vary the power delivered to the LEDs by methods such as pulse width modulation (PWM). Optionally, the housing 102 may be attached to a support structure, such as a base or mounting yoke, optionally by one or more connectors.

Figure 2:
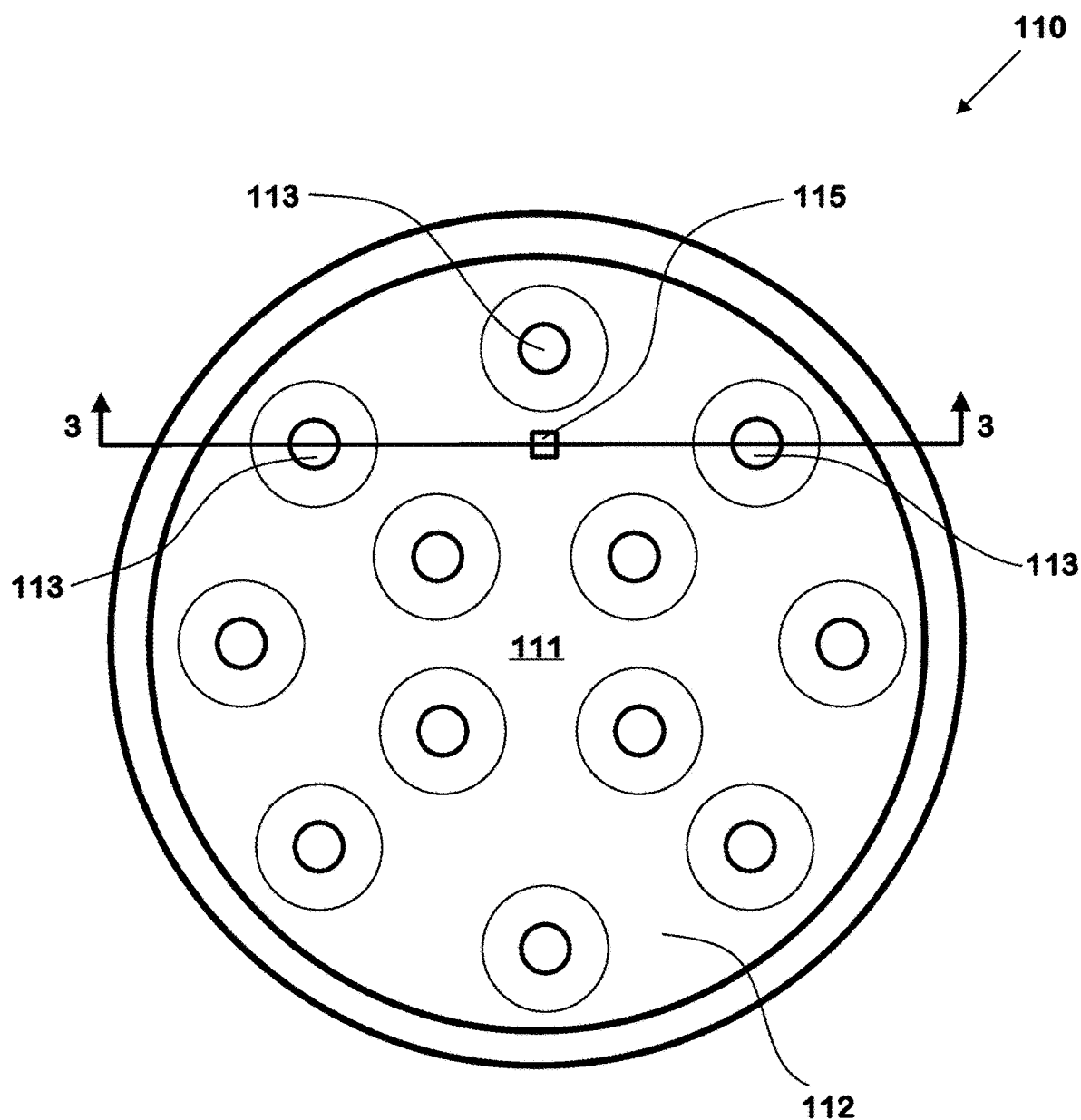
FIG. 2 illustrates a top view of an example lighting module, according to an embodiment.
Figure 3:
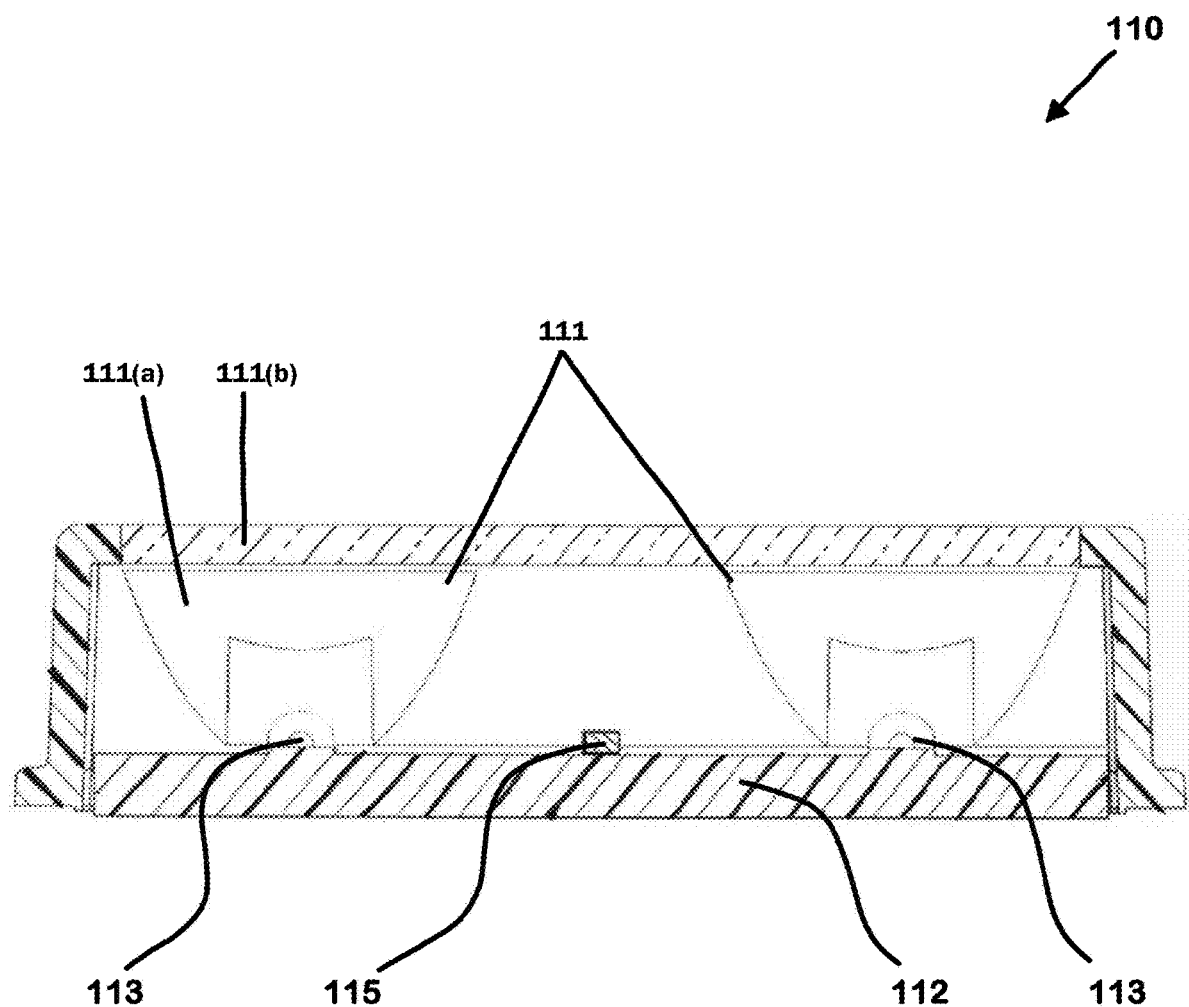

FIG. 2 illustrates a top view of an example lighting module 110 according to an embodiment, while FIG. 3 illustrates a cross sectional view of the lighting module 110 along cutline 3-3 in FIG. 2.

Referring now to FIG. 2 and FIG. 3, the lighting device 100 shown in FIG. 1, for example, may have eight lighting modules 110. Each lighting module 110 may include a substrate 112 and one or more LEDs 113 positioned on the substrate 112.

In certain embodiments, the substrate 112 may be a supporting structure configured to hold the LEDs 113 in place. For example, the substrate 112 may be made of any support material (such as fiberglass, ceramic, silicon, or aluminum) with conductive elements (such as traces, bars, or wires) placed thereon or therein to direct power, control signal, or the like to the LEDs 113. The conductive elements may be copper, silver or another conductive material and applied as conductive ink, wire, traces, or other materials to provide a conductive pathway. Optionally, the substrate 112 may include a portion that is a circuit board (not shown here). Driver circuitry on the circuit board and/or a controller (e.g., fixture controller) may deliver current, control signals, etc. to the LEDs 113 via one or more conductive elements on the substrate 112, such as conductive lines, traces, bars or wires positioned on the substrate 112. In certain embodiments, various conductors, electronic devices (e.g., sensors), etc. may also be mounted on the substrate 112. For example, a set of module-level conductors may be connected to the lighting module's power source and ground. Each module-level conductor may be connected to one of the conductive elements on the substrate 112.

The LEDs 113 may be arranged in one or more rows, matrices, concentric rings, or other arrangements with corresponding components supported in place and/or spaced apart by supports. The lighting module 110 shown in FIG. 2, for example, may have twelve LEDs 113 positioned on the substrate 112 in two concentric rings. Alternatively, the LEDs 113 in each lighting module 110 may be positioned in curved rows so that when all lighting modules 110 are positioned within the opening, the LED structure (i.e., the lighting device 100 as a whole) may have concentric rings of LEDs 113.

The lighting module 110 may also include an optical assembly 111 configured to control one or more optical properties (e.g., beam angle, direction, stray light, color fringing, etc.) of the light emitted by the LEDs 113 and lighting module 110. In certain embodiments, the optical assembly 111 may also protect the LEDs 113 of a lighting module 110 from environmental elements such as, moisture, rain, dirt, excessive sunlight, or the like. The optical assembly 111 may include one or more optical elements. Examples of such optical elements may include, without limitation, lenses, refractors, reflectors, lens covers, frosted beam optics, and/or the like. The optical elements of an optical assembly 111 may be made from a material, such as, for example and without limitation, plastic, resin, silicone, optical silicone, metal, metal coated plastic, acrylic, or the like. Furthermore, the optical assembly 111 may have many shapes, such as, for example, round, square, rectangular, diamond, or the like.

As shown in FIG. 3, an LED 113 may be located under an optical assembly 111 comprising a collimating lens 111(a). Optionally, a clear optical cover 111(b) may be placed on top of the collimating lens 111(a) to seal and protect the lens and the LEDs from environmental elements. It will be understood to those skilled in the art that the optical assembly 111 illustrated in FIG. 3 is provided as an example, and any other optical elements or their combination thereof may be included in the optical lens assembly 111 of the lighting module 110 without deviating from the principles of this disclosure. For example, the optical assembly 111 of FIG. 3 may include a combination of a reflector and a refractor configured to provide collimation or other properties of light received from the LEDs 113.

A lighting module 110 may include identical optical assemblies 111. Alternatively, at least one of the optical assemblies 111 may be different.

Each lighting module 110 may also include an obstruction sensor 115 for monitoring the conditions or properties of the optical assembly 111 based on a pattern of radiation reflected by the optical assembly 111. For example, the obstruction detection sensor 115 may be configured to emit and capture reflected radiation (e.g., infrared (IR) light or near IR light), and comparing the radiation reflected from the optical assembly 111 to known patterns and sequences, in order to monitor and/or determine the conditions or properties of the optical assembly 111 in real-time, as described below. Such conditions or properties of the optical assembly 111 may be indicative of the presence of obstructions and/or deformities on the optical assembly 111. In example embodiments, the obstruction sensor 115 may analyze the radiation reflected by the optical assembly 111 to detect obstructions due to the presence of elements or objects (e.g., dirt, debris, water, fog, bird droppings, frost, or other objects) and/or the formation of deformities (e.g., cracks, pits, shape changes) on the optical assembly 111.

As discussed above, monitoring conditions or properties of the optical assembly 111 or changes in the optical assembly 111 is important for maintaining a desired light output from each lighting module 110 as well as the health of the lighting device 110 as a whole. The conditions or changes in the optical assembly 111 may be monitored by analyzing the radiation reflected from the optical assembly 111 and comparing it to known patterns and sequences. Specifically, obstructions and/or deformities on the inner surface and/or the outer surface of the optical assembly 111 may cause changes in the known patterns or sequences of the reflected radiation obtained from non-obstructed optical assembly and/or provide patterns or sequences corresponding to a type of obstruction. Examples of obstructions or deformities on the inner surface of the optical assembly 111 may include, without limitation, condensation caused by humid air near the lighting module 110, dirt particle accumulation, discoloration of an optical element (e.g., due to overheating), warping, or the like. Examples of obstructions or deformities on the outer surface of the optical assembly 111, may include, without limitation, the accumulation of dust, dirt, or grime, the application of paint or stickers due to vandalism, the warping due to overheating, discoloration of an optical element (i.e., the yellowing of polycarbonate materials), cracks due to accidental impacts from sporting equipment, formation of pits, or the like. As discussed above, presence of obstructions and/or deformities on the optical assembly 111 may lead to changes in the output light distribution from the lighting module 110 and/or excessive heating of the inside lighting module 110 thus causing damage to one or more components of the lighting module 110 (e.g., the LEDs 113 and the circuitry on the substrate 112).

In certain embodiments, the reflected radiation pattern may provide information about the conditions or properties of the optical assembly 111, such as, for example, presence of an obstruction and/or a deformity on the optical assembly 111, the type of obstruction and/or deformity (dirt, water, warping, etc.); the degree of obstruction and/or deformity (e.g., amount of dirt, moisture, degree of warping, amount of discoloration, size of a crack, etc.); location of obstruction and/or deformity; or the like. For example, the obstruction sensor 115 may compare the received reflected radiation pattern with known patterns corresponding to the type of obstruction and/or deformity, the degree of obstruction and/or deformity, the location of obstruction and/or deformity, etc.

The obstruction sensor 115 may include a transceiver assembly (not shown) and has a line-of-sight to at least one optical element of the optical assembly 111 for transmitting radiation (e.g., IR radiation) to the optical assembly 111, and receiving the reflected radiation. The obstruction sensor 115 may also include a processor (not shown) configured to analyze the reflected radiation pattern to provide information about the conditions or properties of the optical assembly 111. Alternatively and/or additionally, the processor may not be included in the obstruction sensor 115 and an external processor (e.g., a processor of the lighting device 100) may receive data from the obstruction sensor 115 via a communications link for analysis. The obstruction sensor 115 may also be connected to the power source and/or the control circuit(s) (e.g., via traces or conductors) of the lighting module 110 to provide power and/or data communication to the obstruction sensor 115.

An example obstruction sensor 115 may include an IR sensor.

In certain embodiments, the obstruction sensor 115 may be mounted on the substrate 112 at a location that allows radiation emitted by the obstruction sensor to be at least partially reflected by an optical element of the optical assembly 111, and the reflected radiation to be received by the obstruction sensor 115 (i.e., within a line-of sight of the optical element). The position of the obstruction sensor 115 on the substrate 112 may be determined based on the field of view of the obstruction sensor 115 and/or the distance to the optical assembly 111 to be monitored, and the optical assembly to be monitored by the obstruction sensor. For example, the obstruction sensor 115 may be positioned centrally on the substrate 112 and/or, as shown in FIG. 2, positioned spaced a distance from the center to enable it to monitor the conditions of a portion of the optical assembly 111 that lies within the "field of view" of the obstruction sensor 115. The position shown in FIG. 2 is provided by way of example only and may be changed based on, without limitation, the field of view of the obstruction sensor 115, placement of one or more components inside the lighting module 110 which may block the field of view, or the like. Specifically, placement of the obstruction sensor 115 at other locations within the lighting module 110 is within the scope of this disclosure. In certain embodiments, the obstruction sensor 115 may have dimensions that allow for mounting of the obstruction sensor 115 on the substrate 112 of a lighting module 110 (e.g., approximately 1-5 mm$^2$ surface area and negligible thickness). In certain embodiments, the obstruction sensor field of view may be generally circular, and the size of the obstruction sensor 115 is such that it can be considered to be a point source/detector. The diameter of the circular field of view may increase with distance from the source to define a cone whose apex is at the center of the obstruction sensor 115. The conditions monitored by an obstruction sensor may correspond to an average of conditions of all objects in the field of view of the obstruction sensor 115. Example conical field of views for the obstruction sensor 115 of the current disclosure may be about 10° to about 90°, about 15° to about 75°, about 25° to about 65°, or about 35° to about 65°.

While the current disclosure describes the obstruction sensor 115 as being mounted on the substrate 112 of the lighting module 110, the disclosure is not so limiting. For example, the obstruction sensor 115 may be mounted on a different supporting structure other than the substrate 112 for monitoring the conditions of the optical assembly 111.

In certain embodiments, a lighting module 110 may include one or more obstruction sensors 115. Optionally, a lighting module 110 may not include an obstruction sensor 115, and an obstruction sensor 115 located outside the lighting module 110 (e.g., included in another lighting module, and/or in an area shared by the lighting modules of the lighting device 100) may be configured to monitor the properties or conditions of an optical assembly 111 of that lighting module 110. The obstruction sensors 115 may likewise by spaced apart evenly or placed randomly in the lighting modules 110 of a lighting device 100.

Some minor obstructions may cause further major obstructions such as, for example, a minor accumulation of dust may cause the internal temperature of the lighting module 110 to increase (i.e., overheat), thus further causing a warping of the optical assembly 111, which creates even more overheating that causes yet even further major damage by cracking the optical assembly 111. Minor obstructions, such as dust, dirt and grime, may be easily wiped off during normal preventive maintenance, whereas major obstructions, such as yellowing, warping, and cracks require costly replacement of the optical assembly 111 or the complete lighting module 110. As such, the obstruction sensor 115 of the current disclosure may be used for continuous monitoring of the optical assembly 111 of a lighting module 110, and may be configured to cause a processor to provide alerts, prompts, perform automatic restorative actions (e.g., corrective or preventive maintenance action), and/or instructions to prevent and/or reduce severity of damage to a lighting module 110. For example, if it is determined that the amount of accumulation of dirt/debris (i.e., obstruction or deformity) is over a threshold (as determined by analyzing the reflection pattern), a prompt or an alert may be provided to a user to clean and/or repair the optical assembly 111. Alternatively and/or additionally, the power delivered to the LEDs may be controlled (e.g., switched off or reduced) to prevent further damage to the lighting module 110 until the dirt and debris (i.e., obstruction and/or deformity) has been removed or repaired from the optical assembly 111.

In one or more embodiments, the threshold may be determined based on one or more of the following: the type of LEDs, material of the optical elements of the optical assembly, material of other components of the lighting module, ambient conditions (e.g., outside temperature, pressure, humidity, internal temperature, etc.), type of use of the lighting device (e.g., constant use v. occasional use), efficiency of the heat sink, or the like.

In one or more embodiments, the obstruction sensor 115 may be an active infrared (IR) sensor that transmits and receives IR radiation, for example, over a 180° hemisphere substantially normal to the substrate 112. The IR obstruction sensor 115 may convert the reflected radiation to a proportional signal (e.g., current or voltage) that is indicative of one or more properties of the optical assembly 111 using a signal processing circuit included in the IR obstruction sensor 115 (and/or send the data to an external processing device for analysis). When an obstruction or deformity occurs, the reflected IR beam collected by an IR obstruction sensor 115 changes in pattern compared to when there is no obstruction or deformity in the optical assembly 111.

As discussed above, data collected by an obstruction sensor 115 may be processed by a processor included in the obstruction sensor 115, and/or may be transmitted to an external processor for analysis (e.g., fixture controller and/or module level controller of the lighting module 110). Optionally, the obstruction sensor 115 may at least partially process the collected data and transmit such processed data to the external processor for further analysis and/or appropriate action. The controller and the obstruction sensor 115 may communicate with each other using any suitable communication protocol such as, without limitation, I2C. The controller may in turn control current delivered to the LEDs 113 of the lighting module 110 based on the received data. For example, the controller may throttle back power/current supplied to one or more LEDs 113 of the lighting module HO if it is determined that the optical assembly 111 has an obstruction level and/or deformity that is greater than a threshold. The controller may throttle back power supplied to one or more. LEDs 113 of the lighting module 110, for example, by decreasing or turning off current supplied to the LEDs 113, by decreasing pulse width modulation (PWM), or a combination thereof. In PWM, an oscillating output from the controller repeatedly turns the LEDs 113 on and off based by applying a pulsed voltage. Each pulse is of a constant voltage level and the controller varies the width of each pulse and/or the space between each pulse. When a pulse is active, the LEDs 113 may be turned on, and when the pulses are inactive the LEDs 113 may be turned off. If the duty cycle of the "on" state is 50%, then the LEDs 113 may be on during 50% of the overall cycle of the control pulses. The controller may dim the LEDs 113 by reducing the duty cycle and effectively extending the time period between each "on" pulse, so that the LEDs are off more than they are on. Alternatively, the controller may decrease the brightness of the LEDs 113 by decreasing the duty cycle.

In certain embodiments, the controller may monitor the received data to determine a rate of change in conditions (i.e., rate of increase in obstruction and/or deformity) of the optical assembly 111. Rate of increase in the obstruction and/or deformity of the optical assembly 111 that is more than a threshold may be indicative of other problems in the lighting module 110 (e.g., a leak in the seal of the lighting device or module, excessive accumulation of debris, change in orientation, breakage or other types of damage, or the like). The controller may create and output an alert for a user based upon such determination that includes information about the identified problems.

Figure 4:
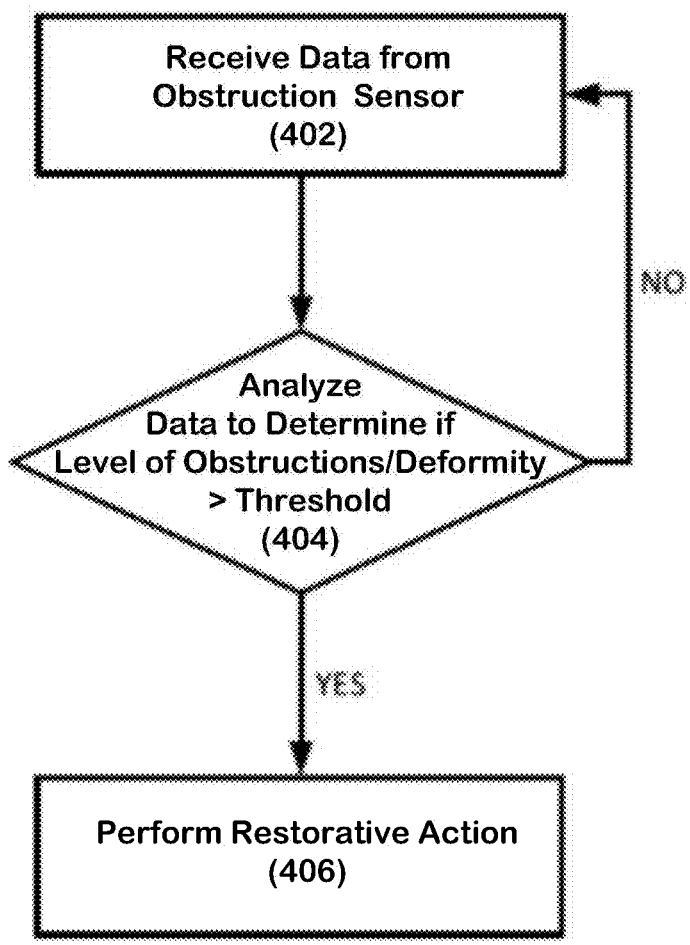
FIG. 4 is a flowchart illustrating an example method for controlling the power supplied to a lighting module based on the detection of an obstruction, according to an embodiment.

FIG. 4 illustrates an example flowchart in accordance with various embodiments illustrating and describing a method 400 of monitoring the clarity of an optical assembly 111 on a lighting module 110 and controlling power supplied to one or more LEDs 113 of the lighting module 110. While the method 400 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 4 but the process may be integrated and/or one or more steps may be performed together, simultaneously, or the steps may be performed in the order disclosed or in an alternate order.

At 402, a controller may receive data relating to the real-time conditions of an optical assembly from one or more obstruction sensor(s) included in a lighting module. The controller may analyze (404) the received data to determine whether there exists a threshold level of obstructions and/or a deformities in the optical assembly. The controller may determine the threshold by accessing a rule set that includes threshold for various parameters such as, without limitation, ambient conditions, material of manufacture, type of LEDs, use of LEDs, efficiency of the heat sink, type of damage to be prevented, etc. (as discussed above).

If it is determined that there exists a threshold level of obstructions and/or a deformities in the optical assembly, the controller may (406) perform a restorative action (to prevent damage to the lighting device and/or cause repair or cleaning of the optical assembly). For example, the controller may provide an alert to a user (e.g., via a mobile device or display) including information about the obstruction and/or deformity (e.g., type of obstruction or deformity, level of obstruction or deformity, position of obstruction or deformity, or the like). Optionally, the controller may also provide instructions to a user corresponding to potential corrective actions (e.g., clean the optical assembly, replace the optical assembly, turn off power, etc.). Alternatively and/or additionally, the controller may itself initiate such corrective action. For example, the controller may selectively throttle back (406) power supplied to one or more LEDs of the lighting module. For example, the controller may throttle back power supplied to one or more LEDs of the lighting module by reducing current supplied to the LEDs or by reducing PWM. In certain embodiments, the controller may reduce the power supplied to one or more LEDs while maintaining a desired output of the lighting module (and/or lighting device) at a substantially constant level by, for example, turning on other LEDs and/or other lighting modules, increasing power to other LEDs, increasing PWM for other LEDs, or lighting modules of the lighting device.

As such, controlling the power supplied to the plurality of light sources dependent upon the detection of an obstruction of the lighting module can extend the useful life of the lighting module. For example, the useful life can be extended by limiting the possibility for heat related damage by preventing the temperature to rise above a threshold temperature sufficient to cause damage to the internal components of the lighting module.

Figure 5:
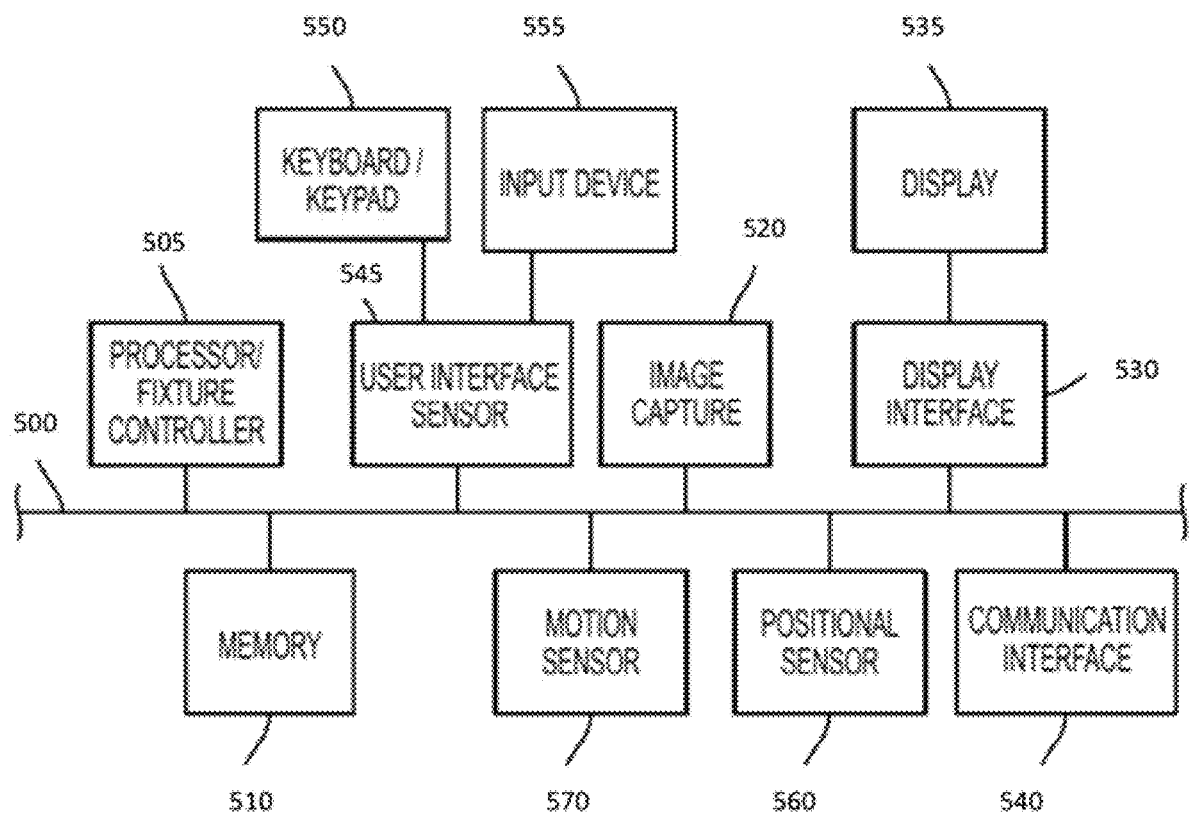
FIG. 5 depicts an example of internal hardware that may be used to contain or implement the various processes and systems as described in this disclosure.

FIG. 5 is a block diagram of hardware that may be including in any of the electronic devices described above, such as a lighting device 100, an obstruction sensor 115, or device controller of the lighting device 100. A bus 500 serves as an information highway interconnecting the other illustrated components of the hardware. The bus may be a physical connection between elements of the system, or a wired or wireless communication system via which various elements of the system share data. Processor 505 is a processing device of the system performing calculations and logic operations required to execute a program. Processor 505, alone or in conjunction with one or more of the other elements disclosed in FIG. 5, is an example of a processing device, computing device or processor as such terms are used within this disclosure. The processing device 505 may be a physical processing device, a virtual device contained within another processing device, or a container included within a processing device. If the electronic device is a lighting device 100, processor 505 may be a component of a fixture controller, and the lighting device 100 would also include a power supply and optical radiation source (e.g., at least one LED) as discussed above.

A memory device 510 is a hardware element or segment of a hardware element on which programming instructions, data, or both may be stored. An optional display interface 530 may permit information to be displayed on the display 535 in audio, visual, graphic or alphanumeric format. Communication with external devices, such as a printing device, may occur using various communication interfaces 550, such as a communication port, antenna, or near-field or short-range transceiver. A communication interface 550 may be communicatively connected to a communication network, such as the Internet or an intranet.

The hardware may also include a user input interface 555 which allows for receipt of data from input devices such as a keyboard or keypad 550, or other input device 555 such as a mouse, a touchpad, a touch screen, a remote control, a pointing device, a video input device and/or a microphone. Data also may be received from an image capturing device 520 such as a digital camera or video camera. A positional sensor 560 and/or motion sensor 570 may be included to detect position and movement of the device. Examples of motion sensors 570 include gyroscopes or accelerometers. Examples of positional sensors 560 such as a global positioning system (GPS) sensor device that receives positional data from an external GPS network.

The features and functions described above, as well as alternatives, may be combined into many other systems or applications. Various presently unforeseen or unanticipated alternatives, modifications, variations or improvements may be made by those skilled in the art, each of which is also intended to be encompassed by the disclosed embodiments.

The invention claimed is:

1. A lighting module for a lighting device, the lighting module comprising:
    at least one light source mounted on a substrate;
    an optical assembly positioned to be located over the at least one light source;
    an obstruction sensor comprising a transceiver configured to transmit radiation towards the optical assembly and receive radiation reflected by the optical assembly, wherein the reflected radiation is indicative of one or more conditions of the optical assembly.

2. The lighting module of claim 1, wherein the obstruction sensor is an infrared (IR) sensor and the transmitted radiation is IR radiation.

3. The lighting module of claim 1, further comprising:
    a processor; and
    a non-transitory computer-readable medium comprising programming instructions that when executed by the processor, cause the processor to:
        receive information corresponding to the radiation reflected by the optical assembly from the obstruction detection sensor;
        analyze the received information to determine a presence of at least a threshold level of an obstruction or a deformity on the optical assembly; and
        in response to determining the presence of at least the threshold level of the obstruction or the deformity on the optical assembly, perform a restorative action.

4. The lighting module of claim 3, wherein the restorative action comprises providing an alert to a user, the alert comprising at least one of the following:
    instructions to repair the obstruction or the deformity;
    instructions to control power delivered to the at least one light source; or
    information relating to the obstruction or the deformity.

5. The lighting module of claim 4, wherein the programming instructions to control the power delivered to the at least one light source comprise instructions to reduce power delivered to the at least one light source while maintaining a constant illumination output by the lighting device.

6. The lighting module of claim 3, wherein the restorative action comprises controlling power delivered to the at least one light source.

7. The lighting module of claim 3, wherein further comprising programming instructions configured to cause the processor to:
    analyze the received information to determine a rate of change of conditions of the optical assembly;
    analyze the rate of change of conditions to determine whether the lighting module includes a problem; and
    provide an alert to a user, wherein the alert includes information about the problem.

8. The lighting module of claim 3, wherein the obstruction or the deformity comprises at least one of the following on an inside or an outside of the optical assembly: accumulation of debris, accumulation of dirt, accumulation of water, accumulation of moisture, change in color, change in shape, breakage, accumulation of foreign materials, or formation of pits.

9. The lighting module of claim 3, wherein the threshold level is determined based on at least one of the following: a type of the at least one light source, a material of the optical assembly, a material of other components of the lighting module, one or more ambient conditions, a type of use of the lighting module, or efficiency of a heat sink associated with the lighting module.

10. The lighting module of claim 3, further comprising programming instructions that cause the processor to analyze the received information to determine, about the obstruction or the deformity, at least one of the following: a type of obstruction or deformity, a level of obstruction or deformity, or a location of obstruction or deformity on the optical assembly.

11. The lighting module of claim 1, wherein the at least one light source is a light emitting diode (LED).

12. The lighting module of claim 1, wherein the obstruction sensor is mounted on the substrate.

13. An obstruction sensor for sensing real-time conditions of an optical assembly of a lighting device, the obstruction sensor comprising a transceiver configured to transmit radiation towards the optical assembly and receive radiation reflected by the optical assembly, wherein the reflected radiation is indicative of one or more conditions of the optical assembly.

14. The obstruction sensor of claim 13, further comprising:
   a processor; and
   a non-transitory computer-readable medium comprising programming instructions that when executed by the processor, cause the processor to:
      receive information corresponding to the radiation reflected by the optical assembly from the obstruction detection sensor;
      analyze the received information to determine a presence of at least a threshold level of an obstruction or a deformity on the optical assembly; and
      in response to determining the presence of at least the threshold level of the obstruction or the deformity on the optical assembly, perform a restorative action.

15. The obstruction sensor of claim 14, wherein the restorative action comprises providing an alert to a user, the alert comprising at least one of the following:
   instructions to repair the obstruction or the deformity;
   instructions to control power delivered to the lighting device; or
   information relating to the obstruction or the deformity;
   wherein the programming instructions to control the power delivered to the lighting device comprise instructions to reduce power delivered to the lighting device while maintaining a constant illumination output by the lighting device.

16. The obstruction sensor of claim 14, wherein the restorative action comprises controlling power delivered to the lighting device.

17. The obstruction sensor of claim 14, wherein further comprising programming instructions configured to cause the processor to:
   analyze the received information to determine a rate of change of conditions of the optical assembly;
   analyze the rate of change of conditions to determine whether the lighting device includes a problem; and
   provide an alert to a user, wherein the alert includes information about the problem.

18. The obstruction sensor of claim 14, wherein the obstruction or the deformity comprises at least one of the following on an inside or an outside of the optical assembly: accumulation of debris, accumulation of dirt, accumulation of water, accumulation of moisture, change in color, change in shape, breakage, accumulation of foreign materials, or formation of pits.

19. The obstruction sensor of claim 14, wherein the threshold level is determined based on at least one of the following: a type of the lighting device, a type of use of the lighting device, a material of the optical assembly, a material of other components of the lighting device, one or more ambient conditions, or efficiency of a heat sink associated with the lighting device.

20. The obstruction sensor of claim 14, further comprising programming instructions that cause the processor to analyze the received information to determine, about the obstruction or the deformity, at least one of the following: a type of obstruction or deformity, a level of obstruction or deformity, or a location of obstruction or deformity on the optical assembly.

* * * * *